(12) United States Patent
Mun et al.

(10) Patent No.: US 9,106,335 B2
(45) Date of Patent: Aug. 11, 2015

(54) AUTOMATIC WAVELENGTH RECOGNITION APPARATUS AND METHOD

(75) Inventors: Sil-Gu Mun, Daejeon-si (KR); Eun-Gu Lee, Daejeon-si (KR); Dong-Min Seol, Seoul (KR); Eui-Suk Jung, Daejeon-si (KR); Sang-Soo Lee, Daejeon-si (KR); Jeong-Sik Cho, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 115 days.

(21) Appl. No.: 13/538,482

(22) Filed: Jun. 29, 2012

(65) Prior Publication Data

US 2013/0004165 A1 Jan. 3, 2013

(30) Foreign Application Priority Data

Jun. 30, 2011 (KR) .......... 10-2011-0064258
Jun. 27, 2012 (KR) .......... 10-2012-0069290

(51) Int. Cl.
*H04J 14/02* (2006.01)
*G01J 3/51* (2006.01)
*H04B 10/079* (2013.01)

(52) U.S. Cl.
CPC .......... *H04B 10/07957* (2013.01); *G01J 3/513* (2013.01); *H04J 14/0258* (2013.01); *H04J 14/0282* (2013.01)

(58) Field of Classification Search
CPC ........................................ G01J 3/513

USPC ........................... 398/25, 34; 356/925
See application file for complete search history.

(56) References Cited

U.S. PATENT DOCUMENTS

| 5,930,015 | A | * | 7/1999 | Yamamoto et al. ........... 398/71 |
| 2004/0173732 | A1 | * | 9/2004 | Rogers .................. 250/226 |
| 2005/0078957 | A1 | * | 4/2005 | Hendow .................. 398/33 |
| 2007/0154212 | A1 | * | 7/2007 | Ruchet et al. ............... 398/9 |
| 2008/0253767 | A1 | * | 10/2008 | Galli et al. ................ 398/45 |

FOREIGN PATENT DOCUMENTS

| KR | 10-0675839 | 1/2007 |
| KR | 10-0910940 | 8/2009 |
| KR | 10-0914559 | 9/2009 |

* cited by examiner

*Primary Examiner* — Nathan Curs
(74) *Attorney, Agent, or Firm* — Nelson Mullins Riley & Scarborough LLP; Anthony A. Laurentano, Esq.; Lewis Lee, Esq.

(57) ABSTRACT

Provided are an automatic wavelength recognition apparatus and method. The automatic wavelength recognition apparatus includes: a division unit receiving a single optical signal and dividing the received optical signal into a plurality of optical signals; a plurality of filter units filtering the optical signals and having different and wavelength-dependent pass characteristics; a plurality of detection units detecting the filtered optical signals and measuring intensities of the detected optical signals; at least one comparison unit comparing outputs of any two of the detection units; and a wavelength determination unit receiving an output of the at least one comparison unit and determining a wavelength of the above single optical signal using a pre-stored look-up table.

10 Claims, 11 Drawing Sheets

AUTOMATIC WAVELENGTH RECOGNITION APPARATUS AND METHOD

CROSS-REFERENCE TO RELATED APPLICATION

This application claims the benefit under 35 U.S.C. §119(a) of a Korean Patent Application Nos. 10-2011-0064258, filed on Jun. 30, 2011, and 10-2012-0069290, filed on Jun. 27, 2012, the entire disclosures of which are incorporated herein by references for all purposes.

BACKGROUND

1. Field

The following description relates to a communication network device, and in particular, to an automatic wavelength recognition apparatus and method.

2. Description of the Related Art

To smoothly handle a lot of wired traffic caused by an exponential increase of contents (including images, data and sound) and the use of various applications since the release of smartphones, high bandwidth is required for each subscriber. Conventional networks have limited transmission capacity and degraded transmission quality. To solve these problems, various forms of wavelength-division-multiplexed passive optical network (WDM-PON) architectures have been suggested. A WDM-PON provides high bandwidth by physically connecting a central office (or telephone office) and each subscriber on a point-to-point basis. However, since a single wavelength should be allocated to each subscriber, a light source used should be wavelength-independent and inexpensive. An ideal light source that meets the above requirements and can be used in transmitters of an optical network unit (ONU) and an optical line terminal (OLT) is a wavelength tunable light source that can vary a wavelength allocated to each subscriber.

However, when a wavelength tunable light source is used in a conventional ONU and a conventional OLT, since a wavelength corresponding to each channel (or port) to which the wavelength tunable light source is to be connected cannot be identified, it is difficult to recognize a wavelength of a channel in which the wavelength tunable light source is to be installed and initialize a wavelength of the wavelength tunable light source. Therefore, an installation engineer has to visit a subscriber's place, carrying a wavelength measurement device for recognizing or determining a wavelength corresponding to a channel (or port) at an installation position. In addition, the installation engineer has to manually input a value corresponding to an initial installation wavelength.

In Korean Patent Publication No. 10-2006-0065415, entitled "System and Method for Monitoring and Controlling the Optical Characteristics of the Optical Transceiver in WDM-PONs," a network that can implement a simple network management protocol (SNMP) trap service is constructed for wavelength initialization. However, the construction of the network may incur high costs.

SUMMARY

It is an objective of the present invention to automatically recognize a wavelength of a channel without additional settings in various communication environments and thereby to easily initialize a wavelength of a wavelength tunable light source.

In one general aspect, there is provided an automatic wavelength recognition apparatus including: a division unit receiving a single optical signal and dividing the received optical signal into a plurality of optical signals; a plurality of filter units filtering the optical signals and having different and wavelength-dependent pass characteristics; a plurality of detection units detecting the filtered optical signals and measuring intensities of the detected optical signals; at least one comparison unit comparing outputs of any two of the detection units; and a wavelength determination unit receiving an output of the at least one comparison unit and determining a wavelength of the above single optical signal using a pre-stored look-up table.

Here, the detection units may be photodiodes.

The apparatus may further include a plurality of adaptive filter units which compensate for the pass characteristics of the filter units.

In addition, the apparatus may further include a reference detection unit which detects one of the optical signals output from the division unit and measures an intensity of the detected optical signal, wherein the at least one comparison unit compares an output of one of the detection units with an output of the reference detection unit.

Moreover, the apparatus may further include a reference filter unit which filters one of the optical signals output from the division unit, wherein the reference detection unit detects an output of the reference filter unit and measures an intensity of the detected output.

In another aspect, there is provided a wavelength recognition method including: receiving a single optical signal and dividing the received optical signal into a plurality of optical signals; filtering the optical signals using a plurality of filters having different and wavelength-dependent pass characteristics; detecting the filtered optical signals and measuring intensities of the detected optical signals; comparing any two of a plurality of intensity values and calculating a difference value between the two intensity values; and determining a wavelength of the above single optical signal by receiving at least one difference value and comparing the at least one difference value with a pre-stored look-up table.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. Descriptions of well-known functions and constructions are omitted to increase clarity and conciseness. Also, the terms used in the following description are terms defined taking into consideration the functions obtained in accordance with the present invention, and may be changed in accordance with the option of a user or operator or a usual practice. Therefore, the definitions of these terms should be determined based on the entire content of this specification.

Figure 1:
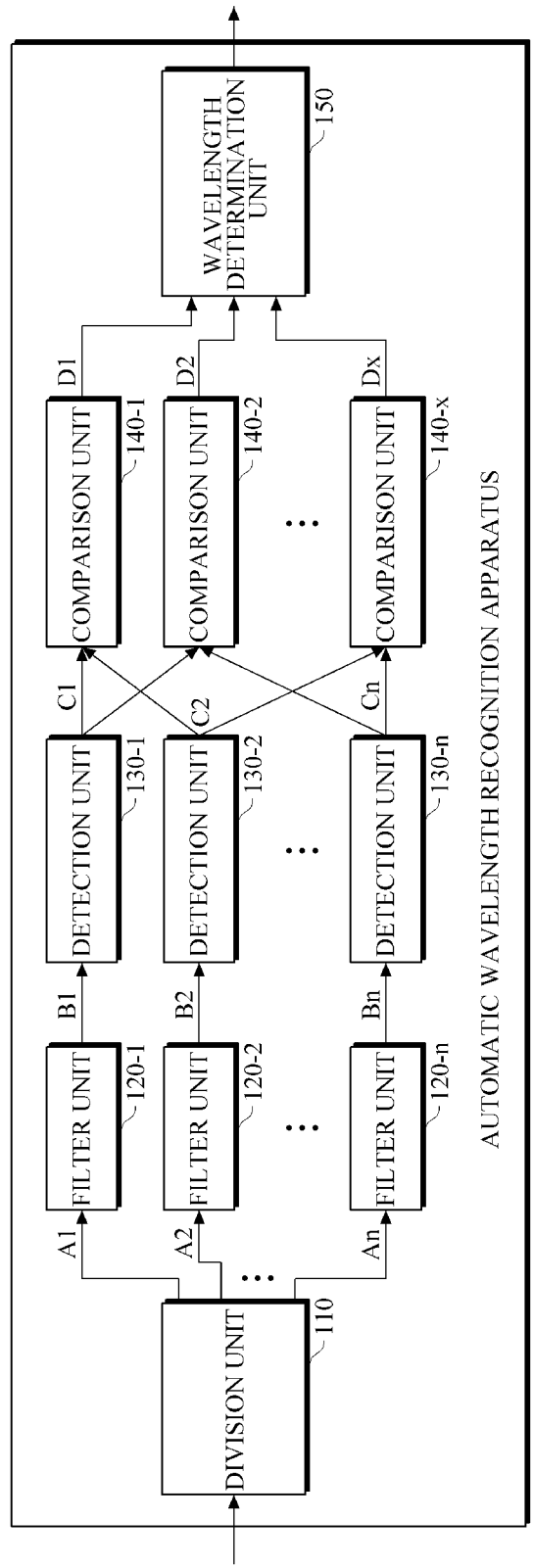
FIG. 1 is a diagram illustrating the configuration of an automatic wavelength recognition apparatus according to an embodiment of the present invention.

FIG. 1 is a diagram illustrating the configuration of an automatic wavelength recognition apparatus according to an embodiment of the present invention.

Referring to FIG. 1, the automatic wavelength recognition apparatus according to the current embodiment may include a division unit 110, a plurality of filter units 120-1 through 120-n, a plurality of detection units 130-1 through 130-n, one or more comparison units 140-1 through 140-x, and a wavelength determination unit 150.

The division unit 110 receives a single optical signal and divides the received optical signal into a plurality of optical signals. The division unit 110 may be a coupler or a splitter. For example, the division unit 110 may receive a single optical signal and divide the received optical signal into n optical signals A1 through An. Here, the ratio of optical power distribution may vary according to the purpose of useof the present invention.

The filter units 120-1 through 120-n filter optical signals output from the division unit 110. Each of the filter units 120-1 through 120-n has a different pass characteristic according to the wavelength of an input signal. In addition, the filter units 120-1 through 120-n have different pass characteristics. That is, the filter units 120-1 through 120-n have wavelength-dependent pass characteristics and output different values even after filtering the same input signal. For example, the filter units 120-1 through 120n receive the n optical signals A1 through An from the division unit 110, filter the received n optical signals A1 through An, and output n different output signals B1 through Bn.

The detection units 130-1 through 130-n detect a plurality of filtered optical signals and measure intensities of the detected optical signals. For example, the detection units 130-1 through 130-n receive the optical signals B1 through Bn from the filter units 120-1 through 120-n, detect the optical signals B1 through Bn, measure intensities of the optical signals B1 through Bn, and output intensity values C1 through Cn of the optical signals B1 through Bn. When applied in optical communication, the detection units 130-1 through 130-n may be devices (such as photodiodes) that perform a conventional light-receiving function. However, the present invention is not limited thereto, and all types of devices having a measuring function can be used.

The filter unit 120-1 and the detection unit 130-1 can be integrated into a single module or device. Therefore, the filter units 120-1 through 120-n and the detection units 130-1 through 130-n can be integrated into a plurality of modules or devices.

Each of the comparison units 140-1 through 140-x receives outputs of two random detection units and compares the received outputs. For example, each of the comparison units 140-1 through 140-x receives two of the outputs C1 through Cn of the detection units 130-1 through 130-n and calculates a difference value between the two outputs. In this way, the comparison units 140-1 through 140-n output x difference values D1 through Dx. The number of the comparison units 140-1 through 140-x can vary according to the use. The comparison units 140-1 through 140-x can be implemented as analog or digital circuits or a product having the same function as the comparison units 140-1 through 140-x.

The wavelength determination unit 150 receives the outputs D1 through Dx of the comparison units 140-1 through 140-x and determines a wavelength of the above single optical signal, which was initially received by the division unit 110, using a pre-stored look-up table. The wavelength determination unit 150 includes the look-up table which stores, in advance, a wavelength value corresponding to each of the outputs D1 through Dx of the comparison units 140-1 through 140-x. The wavelength determination unit 150 determines only one wavelength value corresponding to all of the outputs D1 through Dx of the comparison units 140-1 through 140-x by comparing the outputs D1 through Dx of the comparison units 140-1 through 140-x with the look-up table.

Figure 2:
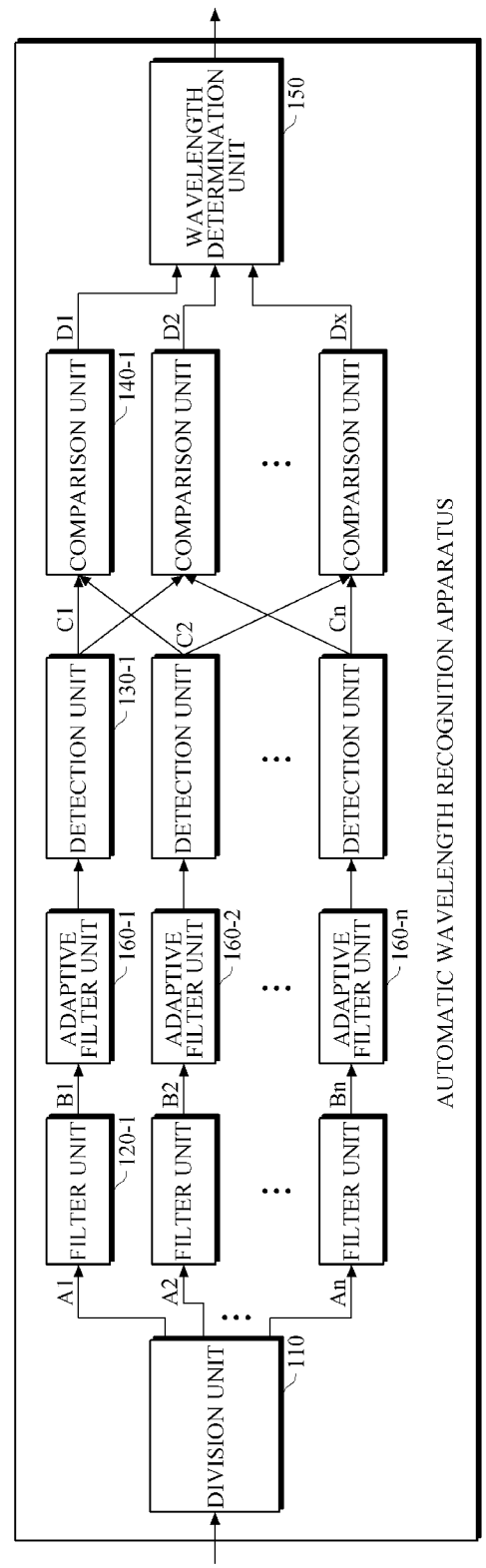
FIG. 2 is a diagram illustrating the configuration of an automatic wavelength recognition apparatus according to another embodiment of the present invention.

FIG. 2 is a diagram illustrating the configuration of an automatic wavelength recognition apparatus according to another embodiment of the present invention.

Referring to FIG. 2, the automatic wavelength recognition apparatus according to the current embodiment may include a plurality of adaptive filter units 160-1 through 160-n in addition to the configuration of the automatic wavelength recognition apparatus shown in FIG. 1.

The adaptive filter units 160-1 through 160-n compensate for the pass characteristics of filter units 120-1 through 120-n. That is, when transmission conditions are changed by the optical fiber or communication line environment or when the pass characteristics of the filter units 120-1 through 120-n are changed or distorted by temperature, the adaptive filter units 160-1 through 160-n adaptively compensate for the changed transmission conditions or the changed or distorted pass characteristics of the filter units 120-1 through 120-n in a controlled manner. For example, the adaptive filter units 160-1 through 160-n receive outputs B1 through Bn of the filter units 120-1 through 120-n, compensate for changes or distortions in the pass characteristics of the filter units 120-1 through 120-n, and output compensated signals.

That is, the adaptive filter units 160-1 through 160-n are provided between the filter units 120-1 through 120-n and detection units 130-1 through 130-n to compensate for changes in the transmission conditions and changes in the pass characteristics of the filter units 120-1 through 120-n according to temperature.

Figure 3:
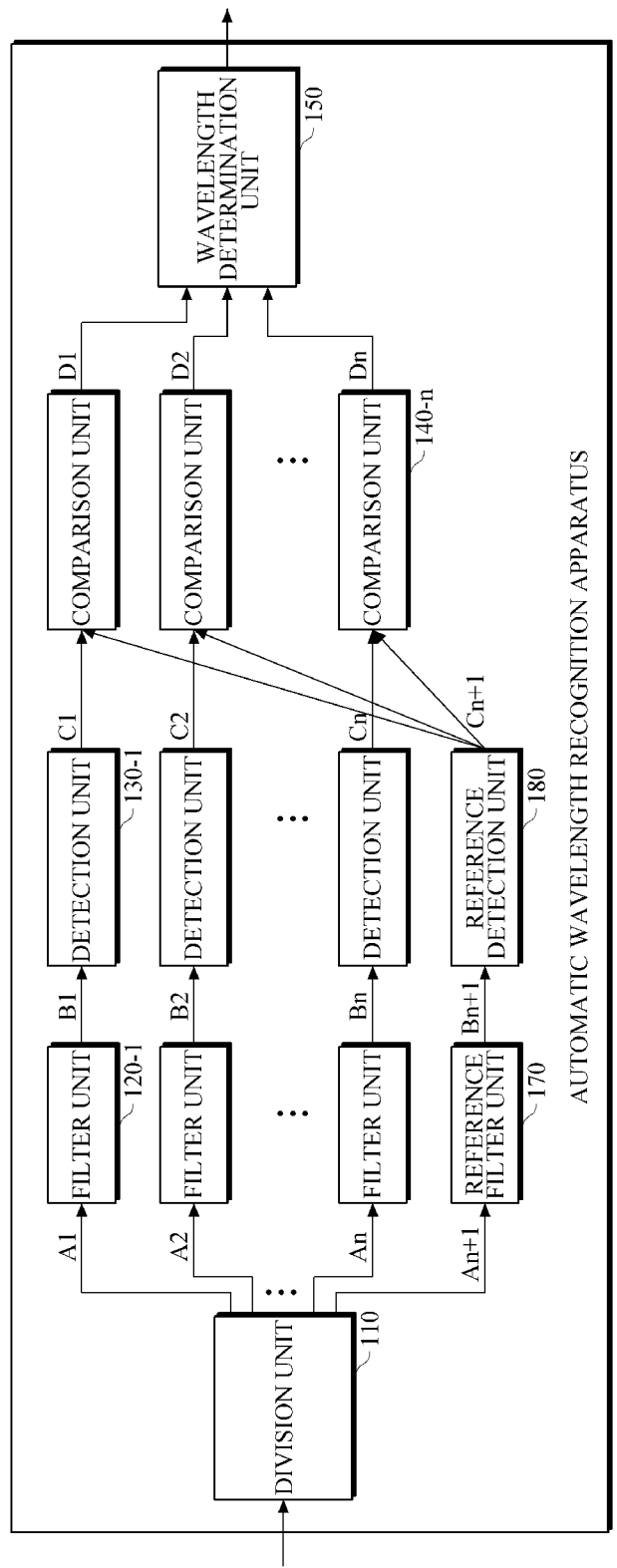
FIG. 3 is a diagram illustrating the configuration of an automatic wavelength recognition apparatus according to another embodiment of the present invention.

FIG. 3 is a diagram illustrating the configuration of an automatic wavelength recognition apparatus according to another embodiment of the present invention.

Referring to FIG. 3, the automatic wavelength recognition apparatus according to the current embodiment may include a reference filter unit 170 and a reference detection unit 180 in addition to the configuration of the automatic wavelength recognition apparatus shown in FIG. 1.

The reference filter unit 170 filters one (An+1) of a plurality of optical signals output from a division unit 110, and the reference detection unit 180 receives the filtered signal, i.e., an optical signal Bn+1 from the reference filter unit 170, detects the optical signal Bn+1, and measures an intensity of the optical signal Bn+1. In this case, each of comparison units 140-1 through 140-n compares one of outputs C1 through Cn of a plurality of detection units 130-1 through 130-n with an output Cn+1 of the reference detection unit 180, calculates a difference value between them, and transmits the difference value to a wavelength determination unit 150. The wavelength determination unit 150 determines a wavelength of an input optical signal using a pre-stored look-up table. For example, the reference filter unit 170 determines a reference filtering value that is to be compared with one of the outputs C1 through Cn of the detection units 130-1 through 130-$n$. Therefore, any optical filter can be used as the reference filter unit 170.

In FIG. 3, one reference filter unit 170 and one reference detection unit 180 are illustrated. However, a plurality of reference filter units 170 and a plurality of reference detection units 180 can also be provided.

Figure 4A:
FIGS. 4A through 4C are diagrams illustrating the configuration of a filter unit.
Figure 4B:
Figure 4C:
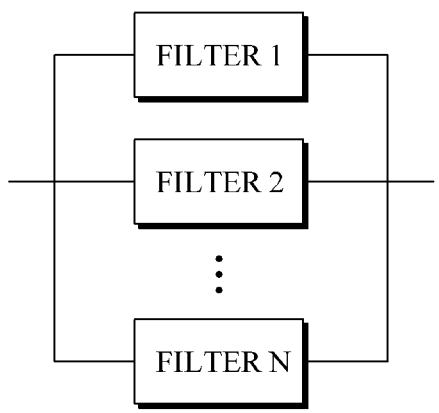

Due to the reference filter unit 170 and the reference detection unit 180, the automatic wavelength recognition apparatus according to the current embodiment can set a reference value and recognize a wavelength using an absolute difference value between the reference value and a compared value FIGS. 4A through 4C are diagrams illustrating the configuration of a filter unit.

Referring to FIGS. 4A through 4C, each of the filter units 120-1 through 120-$n$ may consist of one independent filter as shown in FIG. 4A or a combination of a plurality of filters having different pass characteristics which are connected in series as shown in FIG. 4B or in parallel as shown in FIG. 4C.

Figure 5A:
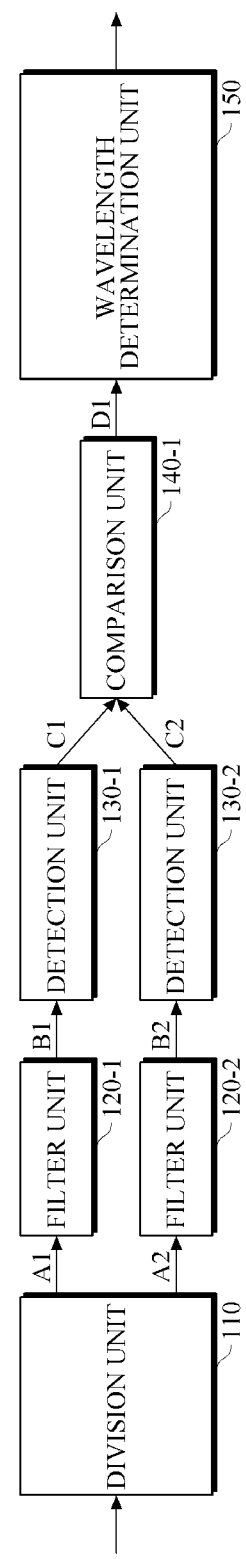
FIGS. 5A through 5C are diagrams illustrating the configuration of the automatic wavelength recognition apparatus of FIG. 1 and outputs of detection units and a comparison unit in a case where n=2.
Figure 5B:
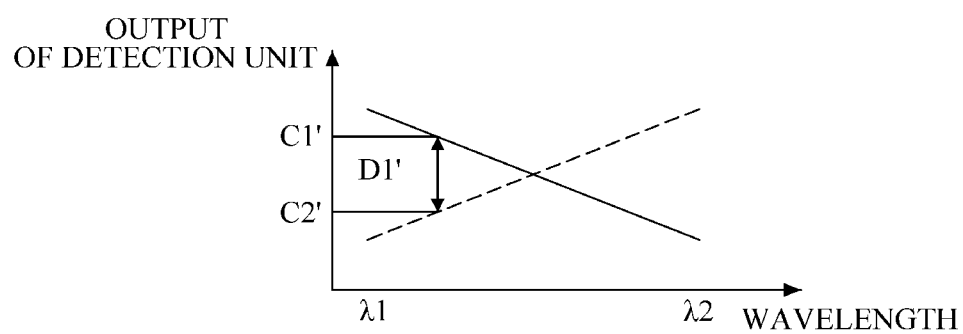
Figure 5C:
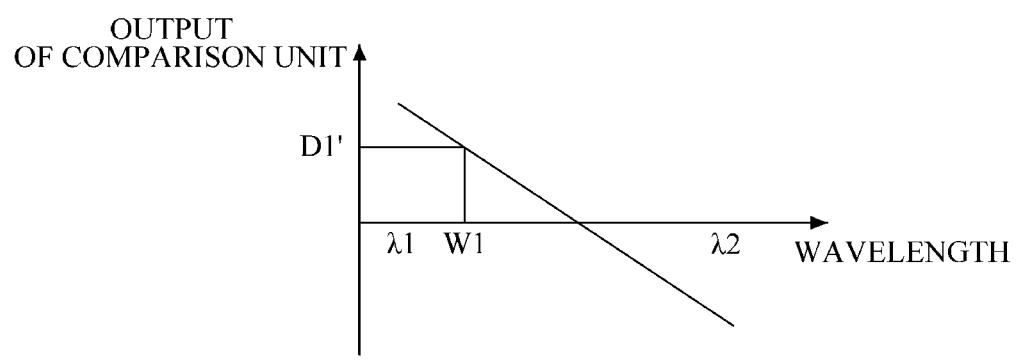

FIGS. 5A through 5C are diagrams illustrating the configuration of the automatic wavelength recognition apparatus of FIG. 1 and outputs of detection units and a comparison unit in a case where n=2.

Referring to FIG. 5A, when n=2, outputs of the division unit 110 may be A1 and A2, respectively, outputs of the filter units 120-1 and 120-2 may be B1 and B2, respectively, outputs of the detection units 130-1 and 130-2 may be C1 and C2, respectively, and an output of the comparison unit 140-1 may be D1. In this case, a graph of the outputs C1 and C2 of the detection units 130-1 and 130-2 may be as shown in FIG. 5B, and a graph of the output D1 of the comparison unit 140-1 may be as shown in FIG. 5C.

Referring to FIG. 5B, a solid line graph represents the variation in C1 with respect to wavelength, and a dotted line graph represents the variation in C2 with respect to wavelength. Here, $\lambda 1$ and $\lambda 2$ respectively indicate lower and upper limits of recognizable wavelengths. When the outputs C1 and C2 of the detection units 130-1 and 130-2 for an input optical signal are C1' and C2', respectively, a difference value between C1' and C2' may be D1' as shown in FIG. 5B, and a wavelength corresponding to the difference value D1' output from the comparison unit 140-1 may be W1 as shown in FIG. 5C. In this case, the wavelength determination unit 150 may determine that a wavelength of the input optical signal is W1 by comparing the output D1' of the comparison unit 140-1 with the pre-stored look-up table. Here, $\lambda 1$ and $\lambda 2$ can vary according to the number of wavelengths used and the wavelength band.

Figure 6:
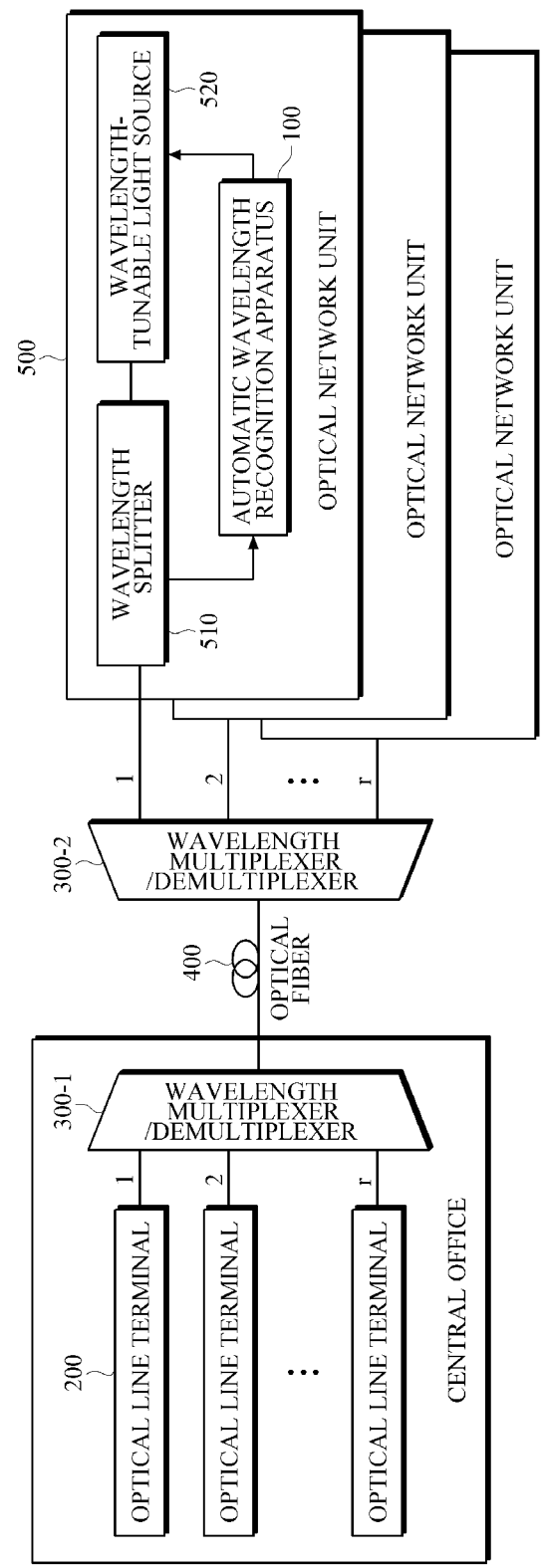
FIG. 6 is a diagram illustrating a wavelength-division-multiplexed passive optical network (WDM-PON) using an automatic wavelength recognition apparatus.

FIG. 6 is a diagram illustrating a wavelength-division-multiplexed passive optical network (WDM-PON) using an automatic wavelength recognition apparatus 100. In FIG. 6, the automatic wavelength recognition apparatus 100 is installed in each optical network unit (ONU) 500 and is used for wavelength initialization of a wavelength tunable light source 520 that transmits upstream signals. However, the automatic wavelength recognition apparatus 100 can also be installed in each optical line terminal (OLT) 200 and can be used for wavelength initialization of a wavelength tunable light source that transmits downstream signals.

An output signal of each OLT 200 is delivered to a corresponding ONU 500 via wavelength multiplexers/demultiplexers 300-1 and 300-2 and an optical fiber (or an optical line) 400. Each of the wavelength multiplexers/demultiplexers 300-1 and 300-2 is used to transmit multiple wavelengths through one optical fiber and divide information received through one optical fiber into multiple wavelengths. An optical signal demultiplexed by the wavelength multiplexer/demultiplexer 300-2 is divided into an upstream wavelength band signal and a downstream wavelength band signal by a wavelength splitter 510. Then, the downstream wavelength band signal is transmitted to the automatic wavelength recognition apparatus 100 and is used for wavelength recognition. A recognized wavelength value output from the automatic wavelength recognition apparatus 100 is fed to the wavelength tunable light source 520 and is used for initialization of a wavelength value of the wavelength tunable light source 520.

Figure 7:
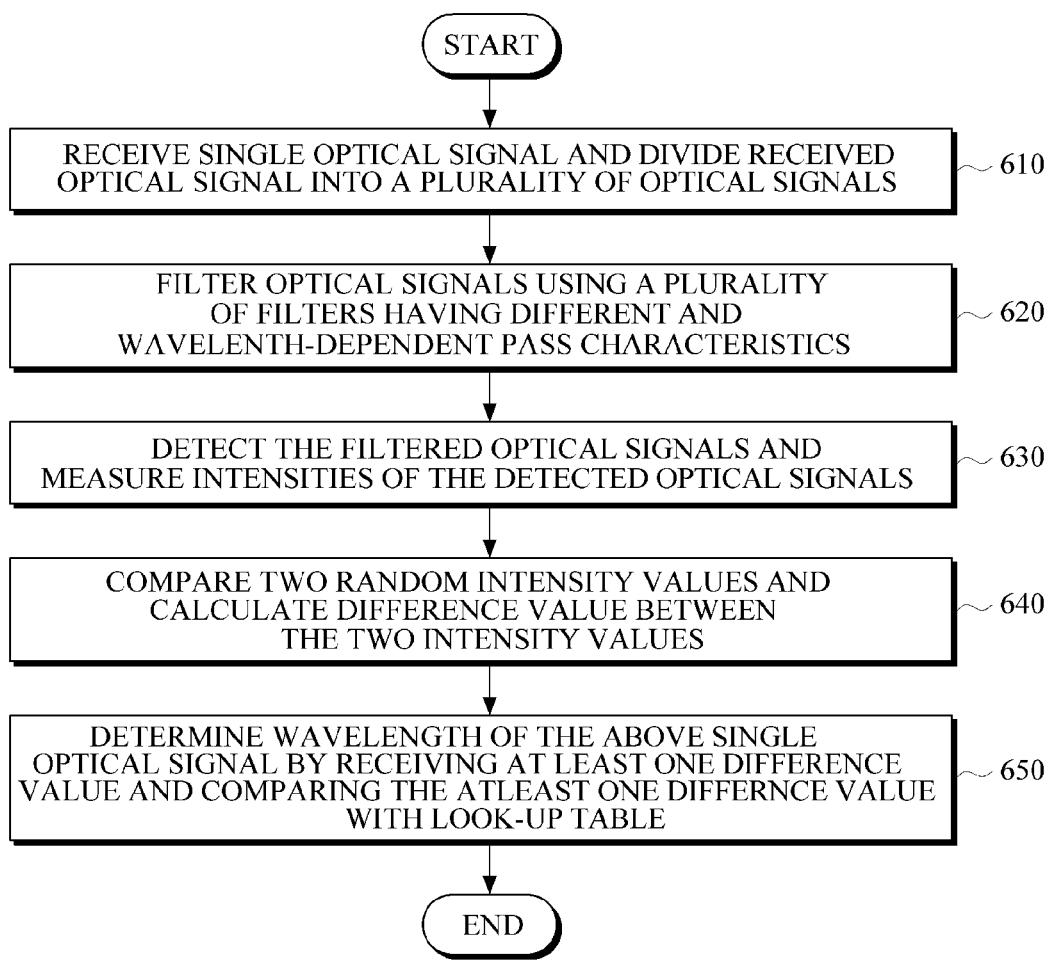
FIG. 7 is a flowchart illustrating a wavelength recognition method according to another embodiment of the present invention.

FIG. 7 is a flowchart illustrating a wavelength recognition method according to another embodiment of the present invention.

Referring to FIG. 7, a single optical signal is received and divided into a plurality of optical signals (operation 610). Here, the single optical signal may be divided using a coupler or a splitter. In addition, the ratio of optical power distribution may vary according to the purpose of use of the present invention. Next, the optical signals are filtered using a plurality of filters having different and wavelength-dependent pass characteristics (operation 620). Then, the filtered optical signals are detected, and intensities of the detected optical signals are measured (operation 630). Here, devices (such as photodiodes) that perform a conventional light-receiving function may be used to detect the filtered optical signals and measure the intensities of the detected optical signals. However, the present invention is not limited thereto, and all types of devices having a measuring function can be used.

Any two of a plurality of intensity values are compared, and a difference value between the two intensity values is calculated (operation 640). Here, the number of comparisons performed can vary according to the use of the present invention.

A wavelength of the above single optical signal is determined by comparing at least one difference value with a pre-stored look-up table (operation 650).

Although not shown in the drawing, the wavelength recognition method may further include compensating for the filtered optical signals using compensation filters that compensate for the pass characteristics of the filters. In addition, the wavelength of the above single optical signal may also be recognized by measuring a reference intensity value using a reference detection unit, comparing an intensity value obtained in operation 630 with the reference intensity value, and comparing a difference value between the two intensity values with the pre-stored look-up table According to the present invention, a wavelength of a channel can be automatically recognized without additional settings in various communication environments, and thus a wavelength of a wavelength tunable light source can be easily initialized. That is, a plug & play function can be implemented.

In addition, since elements of an automatic wavelength recognition apparatus according to the present invention can be integrated into a module or device, the size of the automatic wavelength recognition apparatus can be reduced. Also, since wavelength alignment and management are not required, the maintenance and cost for them can be saved.

Moreover, since expensive optical parts are not used, the automatic wavelength recognition apparatus can be implemented at low cost. In the present invention, a wavelength is recognized using a difference value between signals. Thus, the automatic wavelength recognition apparatus is highly resistant to external noise such as the variation in received optical power.

When pass characteristics of a filter are changed or distorted by temperature, an adaptive filter used in the present invention can detect and compensate for the changed pass characteristics of the filter. Since no strict requirements are needed to select filters, the automatic wavelength recognition apparatus can be manufactured at low cost.

Furthermore, the present invention is applicable irrespectively of the device technology of a wavelength tunable light source and the type of driving method of the wavelength tunable light source.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the examples given but by the patent claims and their legal equivalents.

What is claimed is:

1. An automatic wavelength recognition apparatus comprising:
    a division unit receiving a single optical signal and dividing the received optical signal into a plurality of optical signals;
    a plurality of filter units filtering the optical signals and having different wavelength-dependent pass characteristics;
    a plurality of detection units detecting the filtered optical signals and measuring intensities of the detected optical signals;
    at least one comparison unit comparing the filtered optical signals which indicate the different wavelength-dependent pass characteristics of any two of the filter units; and
    a wavelength determination unit receiving an output of the at least one comparison unit and determining a wavelength of the above single optical signal using a pre-stored look-up table,
    wherein two intensity values of the filtered optical signals are compared and a difference value between the two intensity values is calculated,
    wherein the wavelength of the optical signal is determined by comparing the difference value with the pre-stored look-up table.

2. The apparatus of claim 1, wherein the detection units are photodiodes.

3. The apparatus of claim 1, further comprising a plurality of adaptive filter units which compensate for the pass characteristics of the filter units.

4. The apparatus of claim 1, further comprising a reference detection unit which detects one of the optical signals output from the division unit and measures an intensity of the detected optical signal, wherein the at least one comparison unit compares an output of one of the detection units with an output of the reference detection unit.

5. The apparatus of claim 4, further comprising a reference filter unit which filters one of the optical signals output from the division unit, wherein the reference detection unit detects an output of the reference filter unit and measures an intensity of the detected output.

6. A wavelength recognition method comprising:
    receiving a single optical signal and dividing the received optical signal into a plurality of optical signals;
    filtering the optical signals using a plurality of filters having different wavelength-dependent pass characteristics;
    detecting the filtered optical signals and measuring intensities of the detected optical signals;
    comparing any two of a plurality of intensity values of the filtered optical signals which indicate the different wavelength-dependent pass characteristics of any two of the filter units and calculating a difference value between the two intensity values; and
    determining a wavelength of the above single optical signal by comparing the difference value with a pre-stored look-up table.

7. The method of claim 6, wherein in the detecting of the filtered optical signals, photodiodes are used to detect the filtered optical signals and measure the intensities of the detected optical signals.

8. The method of claim 6, further comprising compensating for the filtered optical signals using compensation filters which compensate for the pass characteristics of the filters.

9. The method of claim 6, further comprising detecting one of the optical signals into which the single optical signal was divided and measuring an intensity of the detected optical signal, wherein in the comparing of the any two of the intensity values, any one of the intensity values obtained in the detecting of the filtered optical signals is compared with an intensity value obtained in the detecting of the one of the optical signals into which the single optical signal was divided.

10. The method of claim 9, further comprising filtering one of the optical signals into which the single optical signal was divided, wherein in the detecting of the one of the optical signals into which the single optical signal was divided, an optical signal filtered in the filtering of the one of the optical signals into which the single optical signal was divided is detected, and an intensity of the detected optical signal is measured.

* * * * *